Feb. 24, 1925.
A. J. PENNINGTON
BEAD FOR STRAIGHT SIDE TIRES
Filed Nov. 16, 1923
1,527,700
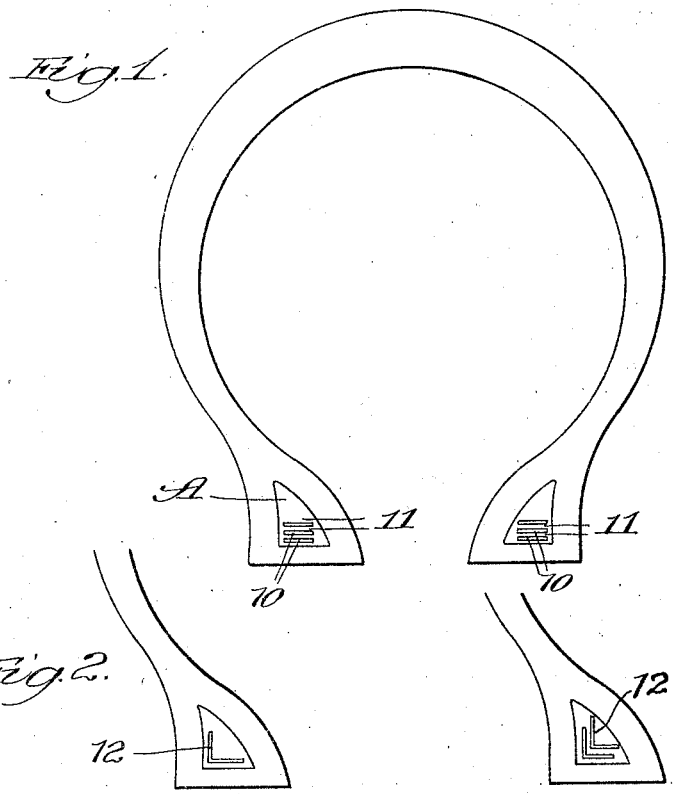
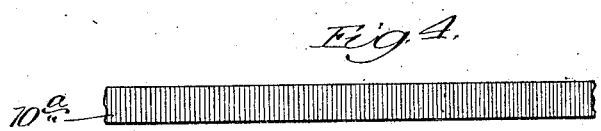
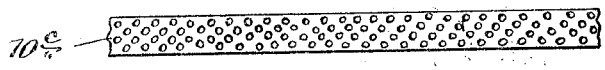
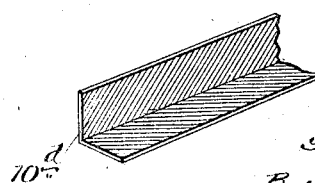
Inventor:
Andrew J. Pennington,
By Dyrenforth, Lee, Chritton & Wiles,
Attys.

Patented Feb. 24, 1925.

1,527,700

UNITED STATES PATENT OFFICE.

ANDREW J. PENNINGTON, OF EAST CLEVELAND, OHIO, ASSIGNOR TO NATIONAL-STANDARD COMPANY, OF NILES, MICHIGAN, A CORPORATION OF MICHIGAN.

BEAD FOR STRAIGHT-SIDE TIRES.

Application filed November 16, 1923. Serial No. 675,120.

*To all whom it may concern:*

Be it known that I, ANDREW J. PENNINGTON, a citizen of the United States, residing at East Cleveland, in the county of Cuyahoga and State of Ohio, have invented new and useful Improvements in a Bead for Straight-Side Tires, of which the following is a specification.

This invention relates to reinforcements for beads for straight-side tires and is fully described in the accompanying specification and shown in the accompanying drawings, in which—

Figure 1 is a transverse diagrammatic view through an automobile tire embodying the invention;

Figs. 2 and 3 are partial diagrammatic views showing modifications; and

Fig. 4 is a detail of different forms of the metal reinforcements used in the beads.

The embodiment shown in Fig. 1 comprises a bead A preferably of triangular cross-section in which is secured one or more layers of flat metal ribbon 10. These may be made up of a continuous strip wound spirally or of separate lengths. The ends of the strips may be left embedded in the rubber and cotton fabric 11 which surrounds these strips and holds them together, or these ends may be secured to each other in any desired manner, particularly in the case of single or separate rings.

The rings may be made up of smooth strips or they may be transversely roughened or corrugated as at 10$^a$, longitudinally ribbed or corrugated as at 10$^b$, perforated as at 10$^c$, or otherwise treated to increase the adhesion between the metal strips and the rubberized fabric.

In Fig. 2 is shown a modification of the idea in which the bead has a reinforcement 12 of angular form, more or less closely conforming to the outer angle of the bead, or to the cavity of the mold in which the bead is formed.

In Fig. 3 is shown another modification in which two or more layers of the reinforcement are used. These may be of the same or different sized material and may be separate or continuous strips as in the first form described.

These angular or L-shaped strips may be similarly roughened or otherwise treated as shown at 10$^d$ to make the rubberized fabric more securely adhere thereto.

It will be understood that these strips will be wound with the rubber impregnated fabric into the desired form for the bead and that the whole will be vulcanized so as to cause the parts to firmly adhere.

While I have shown and described but a few modifications of my invention, it is to be understood that it is capable of many modifications. Changes therefore in the construction and arrangement may be made without departing from the spirit and scope of the invention as disclosed in the appended claim, in which it is my intention to claim all novelty inherent in my invention as broadly as possible in view of the prior art.

I claim:

A tire bead having a reinforcement composed of a strip of flat metal, and a rubberized fabric adhering thereto, said metal being of L-shaped cross-section and being wound in a continuous spiral.

ANDREW J. PENNINGTON.